US006442688B1

United States Patent
Moses et al.

(12) United States Patent
(10) Patent No.: US 6,442,688 B1
(45) Date of Patent: *Aug. 27, 2002

(54) METHOD AND APPARATUS FOR OBTAINING STATUS OF PUBLIC KEY CERTIFICATE UPDATES

(75) Inventors: Timothy E. Moses, Kanata; Sharon M. Boeyen, Stittsville, both of (CA)

(73) Assignee: Entrust Technologies Limited, Ottawa (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,707

(22) Filed: Aug. 29, 1997

(51) Int. Cl.$^7$ ................................................. H04L 9/30
(52) U.S. Cl. ............................ 713/158; 705/76; 380/30
(58) Field of Search ................................. 380/21, 23, 30; 707/6, 8, 9, 10; 713/155, 156, 157, 158, 168, 175; 705/76

(56) References Cited

U.S. PATENT DOCUMENTS

| | | | | |
|---|---|---|---|---|
| 5,133,075 A | * | 7/1992 | Risch | 395/800 |
| 5,261,002 A | * | 11/1993 | Perlman et al. | 380/30 |
| 5,446,888 A | * | 8/1995 | Pyne | 395/600 |
| 5,471,629 A | * | 11/1995 | Risch | 395/800 |
| 5,687,235 A | * | 11/1997 | Perlman et al. | 380/25 |
| 5,699,431 A | * | 12/1997 | Van Oorschot et al. | 380/30 |

* cited by examiner

Primary Examiner—Gilberto Barron, Jr.
Assistant Examiner—Anthony DiLorenzo
(74) Attorney, Agent, or Firm—Vedder, Price, Kaufman & Kammholz (57) ABSTRACT

A method and apparatus for public key certificate updates is accomplished when a user of a secured communications system provides, from time to time, a public key certificate update subscription update to a server. The public key certificate update subscription information identifies at least one subscriber subject (i.e., another end-user) that the user desires to obtain real time public key updates when they occur. In response to the subscription information, the server monitors public key certificates of the at least one subscriber subject. When a change occurs to the public key certificate of the at least one subscriber, the server provides an indication of the change to the requesting user. As such, while the user is on-line with the secured communications system, the server can provide the user with real-time updates of subscriber subjects' encryption public key certificates and/or signature public key certificates. In addition, or as an alternative, to providing the subscription information, the user may provide an indication of a local replica of the public key certificates that it has stored to the server. Upon receiving the replica, the server determines whether the user's replica is consistent with the system's most current public key certificates of the subscriber subjects. If the user's replica is consistent with the current public key certificate, the server provides no response to the user or provides a response indicating that the user's list is current. If, however, the user's replica is not consistent with the current public key certificate, the server provides an indication of the differences to the user. The indication allows the user to update its local lists to be consistent with the most current public key certificate list.

27 Claims, 4 Drawing Sheets

METHOD AND APPARATUS FOR OBTAINING STATUS OF PUBLIC KEY CERTIFICATE UPDATES

TECHNICAL FIELD OF THE INVENTION

The present invention relates generally to public key infrastructure and more particularly to obtaining status information relating to public key management certificate updates.

BACKGROUND OF THE INVENTION

As is known, to securely transmit data from one party to another in a secured communications system, the data needs to be encrypted, via an encryption key and an encryption algorithm, and/or digitally signed. Such an encryption algorithm may be a symmetric key algorithm such as the data encryption standard ("DES") while the encryption key is a corresponding symmetric key. The sending party encrypts the data using the symmetric key algorithm and transmits the encrypted message over a transmission medium to a receiving party. Upon receiving the encrypted message, the receiving party decrypts the message using the same symmetric key, which must be transmitted to the receiving party or derived by the receiving party by some appropriate security means.

Encrypting data using public key algorithms is somewhat more expensive than using a symmetric key algorithm, but the cost, in many circumstances, is justified because of the difficulty in securely providing the symmetric key to both parties. To obtain the cost saving benefits of symmetric key encryption and the key distribution advantages of public/private key pairs, a wrapped session key is provided to the receiving party along with the data that is encrypted using the symmetric key. The wrapped session key is the symmetric key that has been encrypted using the public key (of the public/private key pair) of the receiving party. When the receiving party receives the encrypted message, it decrypts the wrapped session key using its private key to recapture the symmetric key. Having recaptured the symmetric key, the receiving party utilizes it to decrypt the message. Typically, symmetric keys are used for a relatively short duration (e.g., a communication, a set number of communications, an hour, a day, a few days, etc.), while encryption public keys are used for longer durations (e.g., a week, a month, a year, or more).

To further enhance security of data transmissions in the secured communication system, the sending party provides its digital signature with messages that it transmits. The signature of the sending party consists of a tag computed as a function of both the data being signed and the signature private key of the sender. The receiving party, using the corresponding signature verification public key of the sending party, which accompanies the message, can validate the signature. The signature public key certificate includes the signature public key of the sending party and a signature of the certification authority. The receiving party first verifies the signature of the certification authority using a locally stored trusted public key of the certification authority. Once the signature of the certification authority has been verified, the receiving party can trust any message that was signed by the certification authority. Thus, the signature public key certificate that the receiving party obtained is verified and the signature public key of the sending party can be trusted to verify the signature of the sending party of the message.

As one can imagine, in a secured communication system that has several thousand users, keeping track of encryption keys and verification public keys of the endusers is a monumental task. For example, if the secured communication system is utilized by a large corporation which has 100,000 employees, or more, a certification authority needs to maintain accurate information regarding the encryption public key and the signature public key of each of the 100,000, or more, employees of the corporation. As with any large corporation, employees leave the company requiring their public keys to be deleted from the system, new employees are hired requiring new encryption and signature public keys to be issued, and employees lose their private keys requiring new keys to be issued. In the public key infrastructure environment, it is not uncommon for a certification authority to have to process several thousand public key updates, issues, and re-issues per day.

When a change to an end-user's public key occurs, the other end-users need to be informed of the change such that the end-user whose public key was changed can participate in secure communications. To inform the other end-users of the change, the certification authority issues a certificate revocation list and update messages. The certificate revocation list indicates the public keys that have been revoked, while the update messages are between a subscriber and its certification authority regarding the subscriber's public key certificates. Typically, the certification authority will issue the update messages and revocation list on a daily basis, or even less frequently.

As mentioned for a relatively large secure communication system, thousands of public key changes may occur on a daily basis. To a typical end-user, however, only a few dozen, or less, public key changes will be of interest. Thus, even though a particular end-user may only be interested in a few dozen public key certificate changes, it receives the complete revocation list. To transmit the revocation list to tens of thousands of endusers creates a large amount of data traffic that degrades the overall efficiency of the overall secured communication system.

In addition to the large of amount of data that is being transmitting, the revocation list include data that is up to twenty-four hours old. As such, affected end-users are unable to receive encrypted messages and verify signatures for almost a day. In many secured communication systems, such a lapse of secure communication service is unacceptable. Therefore, a need exists for a method and apparatus that provides an enduser with public key certificate revocations regarding other end-users of interest without the data bandwidth requirements of the above mentioned revocation list.

DETAILED DESCRIPTION OF A PREFERRED EMBODIMENT

Generally, the present invention provides a method and apparatus for public key certificate updates. This is generally accomplished when a user of a secured communications system provides, from time to time, a public key certificate update subscription update to a server. The public key certificate update subscription information identifies at least one subscriber subject (i.e., another end-user) that the user desires to obtain real time public key updates when they occur. In response to the subscription information, the server monitors public key certificates of the at least one subscriber subject. When a change occurs to the public key certificate of the at least one subscriber, the server provides an indication of the change to the requesting user. As such, while the user is on-line with the secured communications system, the server can provide the user with real-time updates of subscriber subjects' encryption public key certificates and/or signature public key certificates.

In addition, or as an alternative, to providing the subscription information, the user may provide an indication of a local replica of the public key certificates that it has stored to the server. Upon receiving the replica, the server determines whether the user's replica is consistent with the system's most current public key certificates of the subscriber subjects. If the user's replica is consistent with the current public key certificate, the server provides no response to the user or provides a response indicating that the user's list is current. If, however, the user's replica is not consistent with the current public key certificate, the server provides an indication of the differences to the user. The indication allows the user to update its local lists to be consistent with the most current public key certificate list. With such a method and apparatus, the present invention provides real-time on-line updating of public key certificates of subscriber subjects identified in a user's subscription or local replica. As such, end-users only receive data relating to other end-users that they are interested in and not an entire list of thousands of users. By providing real-time data limited to the information of interests to a particular user, the data bandwidth requirements of a secured communication system is reduced thereby increasing the system's overall efficiency.

Figure 1:
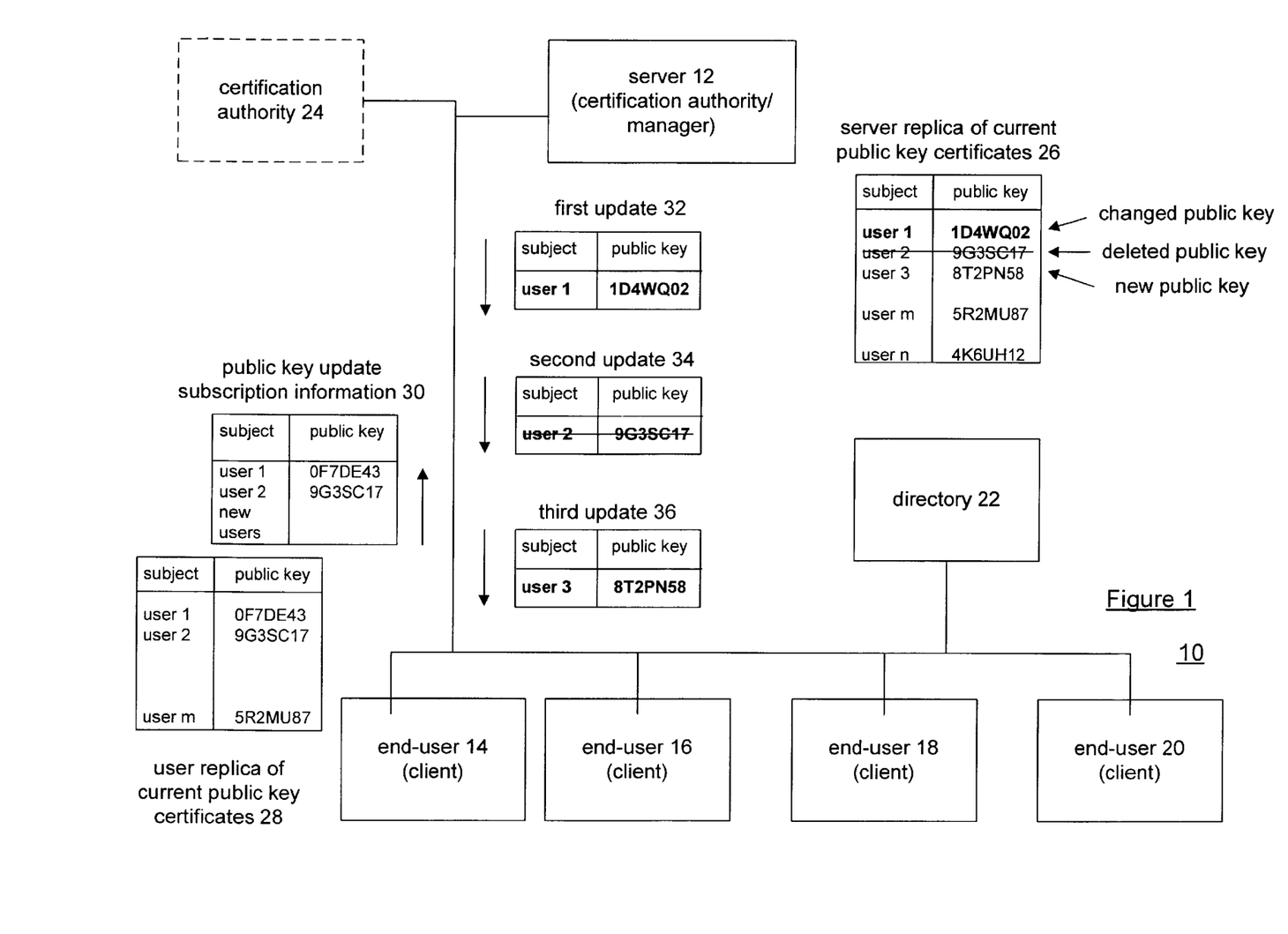
FIG. 1 illustrates a schematic block diagram of a secure communication system in accordance with the present invention.

The present invention can be more fully described with reference to FIGS. 1–4. FIG. 1 illustrates a schematic block diagram of a secured communications system 10 that includes a server 12, a plurality of end-users 14–20, a directory 22, and a certification authority 24. The server 12 (which may also be referred to as a certification authority or manager, such as the entrust/manager software produced by Entrust Technologies, Ltd. which is installed on a personal computer, workstation, or mainframe computer) provides signature public keys, encryption public keys, and private keys to the plurality of endusers 14–20. The private keys are provided directly to the end-user in a secured manner. For example, the private keys may be provided in hard copy via normal postal services or a hand-carried to the end-user. The public keys are posted for all of the other end-users to use. Typically, the encryption public keys of the end-users are stored in the directory 22, which may be a database affiliated with the server 12 and may be accessed by any of the end-users 14–20, the server 12, and the certification authority 24.

The plurality of end-users 14–20, or clients, are personal computers, computers, workstations, or mainframes that have end-user cryptographic software installed on the computer. For example, the end-user cryptographic software may be the Entrust/Client software developed and manufactured by Entrust Technologies Limited. The certification authority 24 may be a separate device as shown, or may be part of the server 12. In either case, the certification authority 24 issues public key certificates (as either signature public key certificates or encryption public key certificate) to any of the end-users. In addition, the certification authority 24 establishes policies of the secured communications system 10. Such policies indicate which certification authorities the end-users can trust, i.e., the certification authority has provided its public keys to the end-users, issuing new trusted public keys and/or deleting trusted public keys.

FIG. 1 further illustrates a server replica of current public key certificates 26. The current public key certificates 26 may be stored in the directory 22, or within the server 12. In either case, the current public key certificates 26 include a field for subjects, i.e., clients, and their associated public key. The public key may be for an encryption public key and/or a signature public key. The current public key certificates 26 are shown to include a changed public key for user 1, a deleted public key for user 2, and a new public key for user 3. These changes have occurred subsequent to the end-user 14 establishing its replica of current public key certificates 28. Note that the certificates in replicas 26 and 28 may further include cross-certificates and attribute certificates.

The end-user's replica of the current public key certificates 28 includes a subject field and a public key field. As with the server replica, the user, or local, replica may include signature public keys and/or encryption public keys. The user, or local, replica of current public key certificates 28, includes only the public keys for users that the enduser has a desire to communicate with. In other words, the end-user builds its own list of subjects that it communicates with and stores it in this table of the user replica of current public key certificates 28. The user replica of current public key certificates 28 is not consistent with the server replica of current public key certificates 26. In particular, the public key of user 1 has changed, user 2 has been deleted, and user 3 has been added.

User 1's public key may have changed because user 1 lost its private key and thus had to have a new public/private key pair reissued. User 2 may have been deleted from the system because the user has left the secured communications system (i.e., is no longer a registered user). User 3 may have been added to the secured communications system as a new client. To correct the user's replica of current public key certificates 28, the user provides its replica's public key certificates 28 or the public key update subscription information 30 to the server 12.

If the user provided the public key update subscription 30, the end-user 14 first generates the public key update subscription information 30 to include identity of subscriber subjects that the end-user is interested in and their associated public keys. The subscription information 30 may include a request that the end-user 14 receives public keys for any new users that are added to the system. The server 12, after receiving the public key update subscription information 30, monitors for changes to the subscriber subjects identified in the subscription information 30. When a change occurs, the server 12 provides updates 32, 34 and 36 to the end-user 14.

As shown, the first update 32 indicates that user 1's public key has changed. Since user 1 has been identified by the end-user 14 as a subject of interest in the subscription information 30, the server 12 provides the updated information as soon as it is available to the end-user 14. The end-user 14, providing its on-line with the system, receives the first update 32 and updates its user replica of current public key certificates 28. The server 12 provides the second update 34 and the third update 36 to the end-user 14 once changes are made to the public key of the user 2 and user 3 is added to the system, respectively.

If the end-user, or client, 14 provides an indication of its user replica of the current public key certificates 28 to the server, the end-user transfers a complete copy of the current public key certificates 28 to the server 12 or an encoded message of the user replica. The server 12, upon receiving the user's replica of current public key certificates 28, compares it with its replica of current public key certificates 26. For each difference between the two certificates 26 and 28, the server provides an indication of the difference to the user. The indication may be the actual change, as shown in the updates 32, 34 and 36, or may be an encoded message instructing the end-user how to make the appropriate changes. In either case, the end-user is provided with updates to public keys of subscriber subjects that are of interest to the end-user 14, not thousands of updates that are up to a day old. By limiting the updates to only subscriber subjects of interest, the data bandwidth requirements of the secure communication system are reduced and the overall efficiency of the system 10 is increased.

Figure 2:
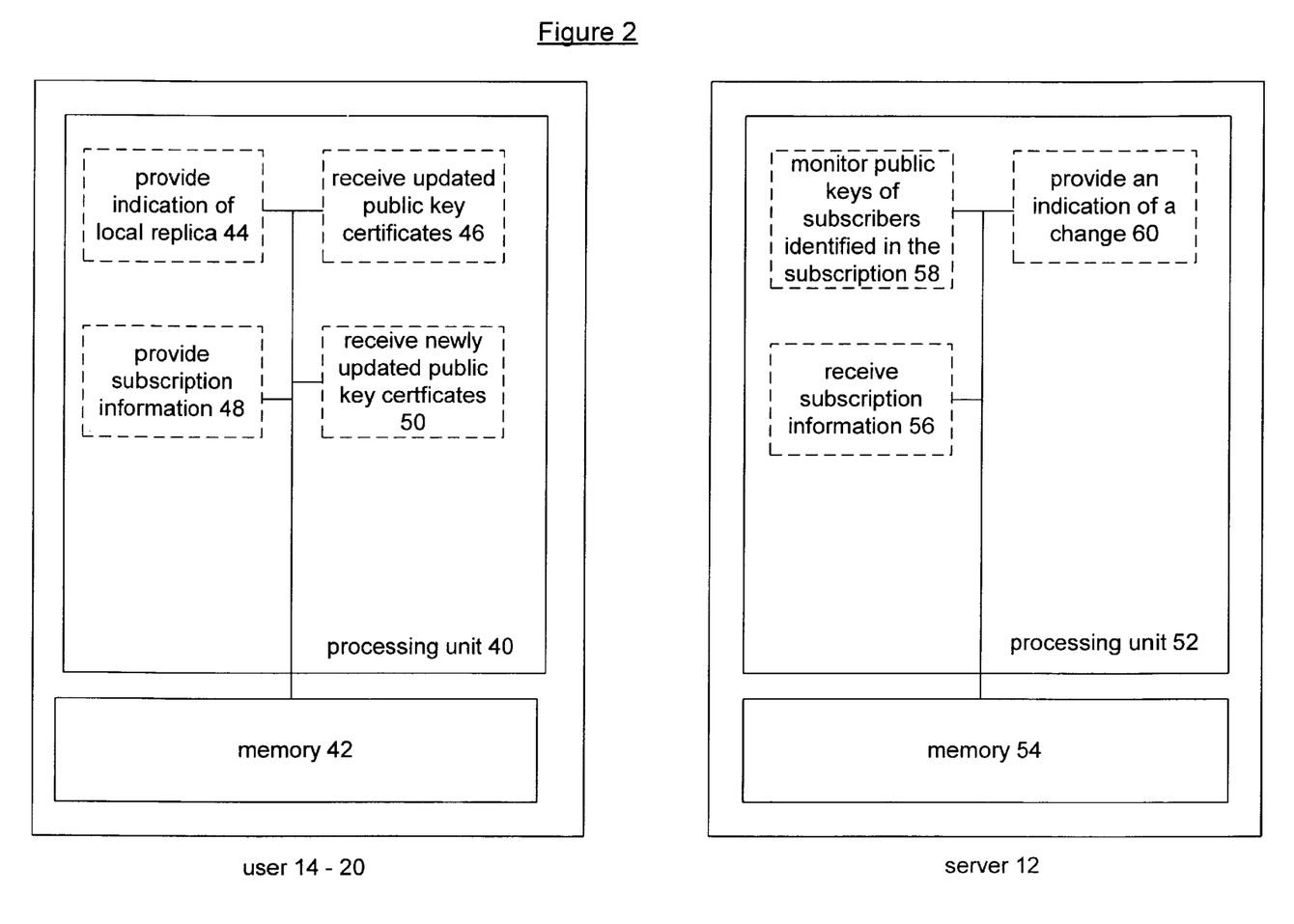
FIG. 2 illustrates a schematic block diagram of a user and server in accordance with the present invention.

FIG. 2 illustrates a schematic block diagram of an end-user device 14–20 and the server 12. The user device 14–20 includes a processing unit 40 and memory 42. The processing unit 40 may be a microprocessor, micro-controller, microcomputer, digital signal processor, or any other device that manipulates digital information based on programming instructions. The memory 42, which stores programming instructions that are read by the processing unit 40, may be a read-only memory, RAM, CD ROM, DVD ROM, floppy disk, hard drive, or any other means for storing digital information in a retrievable format.

In operation, the processing unit 40 reads the programming instructions stored in memory 42 to provide an indication of the local replica of the public key certificates 44. The programming instructions also cause the processing unit 40 to receive updated public key certificates 46, to provide subscription information 48, and to receive newly updated public key certificates 50. The functions performed by the processing unit 40 while executing the programming instructions stored in memory 42 will be discussed in greater detail with reference to FIGS. 3 and 4.

The server 12 includes a processing unit 52 and memory 54. The processing unit 52 may be a microprocessor, micro-controller, microcomputer, digital signal processor, portion of a central processing unit, or any other device that manipulates digital information based on programming instructions. The memory 54, which stores programming instructions, may be a read-only memory, RAM, CD ROM, DVD ROM, hard drive, floppy disk, or any other means for storing digital information in a retrievable manner. The processing unit 52, while performing the programming instructions stored in memory 54 monitors public keys of subscribers identified in the subscription information 58, after receiving such subscription information 56. As a result of the monitoring, the processing unit 52 provides an indication of changes to a user 60. A more detailed discussion of the processing unit's functionality, while performing the programming instructions, will be discussed in greater detail with reference to FIGS. 3 and 4.

Figure 3:
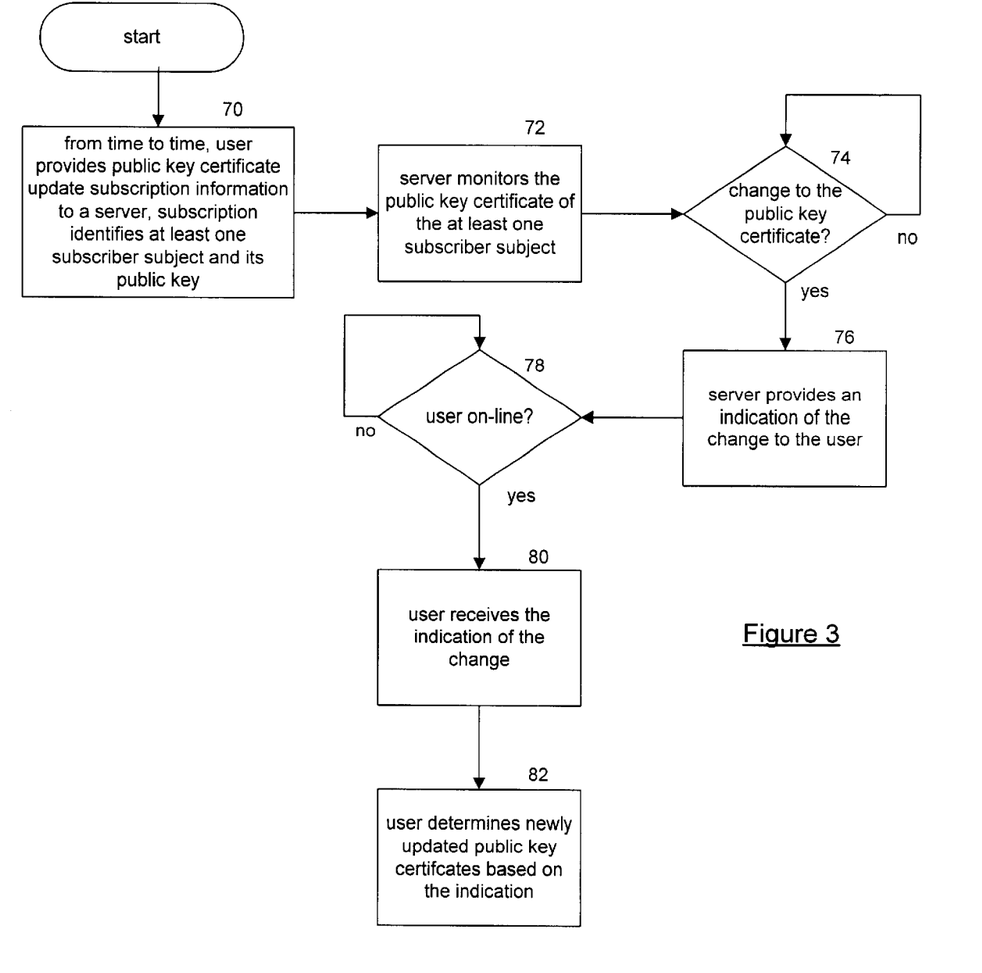
FIG. 3 illustrates a logic diagram which may be used to implement public key certificate updates in accordance with the present invention.

FIG. 3 illustrates a logic diagram of a method for processing public key certificate updates. The process begins at step 70 where, from time to time, a user provides public key certificate update subscription information to the server. The subscription information identifies at least one subscriber subject and includes at least one subscriber subject's public key. The public key included in the subscription information may be a signature public key certificate of the at least one subscriber subject or an encryption public key certificate of the at least one subscriber subject. For the purposes of this discussion, the user may be an end-user as shown in FIG. 1, or a system administrator (not shown in the previous drawings).

The process proceeds to step 72 where the server monitors the public key certificates of the at least one subscriber subject. The server monitors this information by pulling the public key certificates and/or status relating to the at least one subscriber from a certification authority. As such, when the certification authority makes a change to a public key of a subscriber subject of interests, the server pulls that information from the certificate certification authority. In addition, the server may receive information relating to the change of the public key certificate of the at least one subscriber from the certification authority. Thus, the server may push and/or pull information from the certification authority.

The process then proceeds to step 74 where a determination is made as to whether a change has occurred to the public key certificate of the subscriber subject of interest. Note that the at least one subscriber subject may be one subscriber subject or a plurality of subscriber subjects. The process waits at step 74 until a change occurs. Once a change occurs, the process proceeds to step 76 where the server provides an indication of the change to the user. The indication of the change may be provided as an encoded message identifying the change to the public key certificate. Alternatively, the indication may be a copy of the current public key certificate such that the user overwrites its current copy relating to the subscriber subject of interest with the newly-received current public key certificate of the subject subscriber.

Once the server has provided the indication of the change, the process proceeds to step 78 where a determination is made as to whether the user is on-line. If not, the user will not receive the information until it is on-line. Once the user is on-line, the process proceeds to step 80 where the user receives the indication of the change. The process then proceeds to step 82 where the user determines newly updated public key certificates based on the indication. The indication of the newly updated public key certificates may be received as a new public key certificate for the subscriber subject, a revocation of a public key certificate of the subscriber subject, or a change to the public key certificate of the subscriber subject. Note that the public key certificate may be an encryption public key certificate or a signature public key certificate. Once the user has determined the newly updated public key certificates, the user provides the server with an acknowledgment that it has received the indication.

Figure 4:
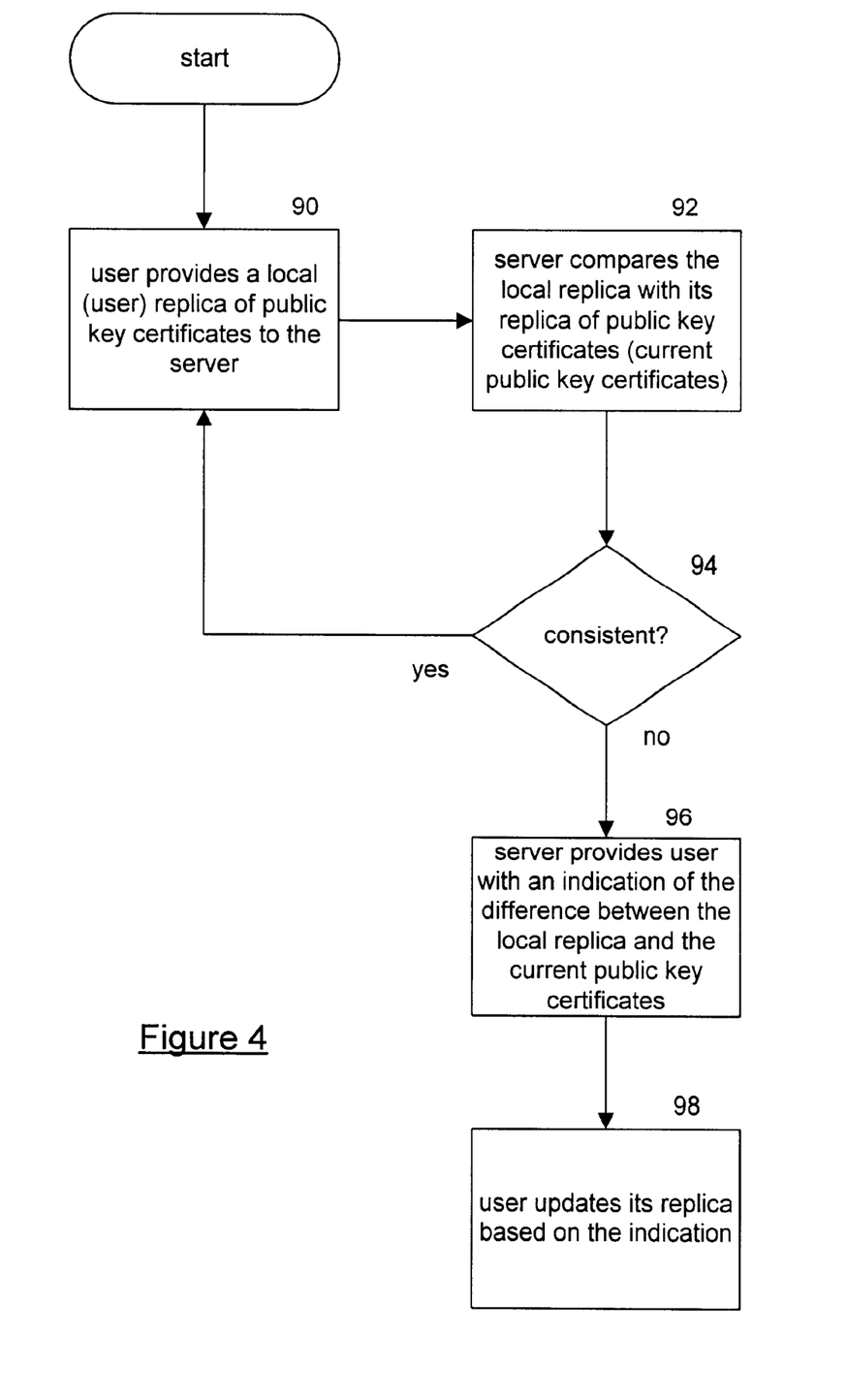
FIG. 4 illustrates a logic diagram for an alternate method of obtaining public key certificate updates in accordance with the present invention.

FIG. 4 illustrates a logic diagram for an alternate method of updating public key certificates. The process begins at step 90 where the user provides an indication of its local, or user, replica of public key certificates to the server. The process then proceeds to step 92 where the server compares the local replica with its replica of current public key certificates. The process then proceeds to step 94 where a determination is made as to whether the local replica is consistent with the server replica. If so, the process reverts back to step 90.

If, however, the local replica and the server replica are not consistent, the process proceeds to step 96. At step 96, the server provides the user with an indication of the differences between the local replica and the current public key certificate. The updated public key certificate, or difference, may be provided as an update to the current public key certificate or a message regarding updates to the public key certificate. The message identifying the differences between the user replica and the server replica may be encoded such that only the addressed end-user may be able to decode the message.

The process then proceeds to step 98 where the user updates its replica of public key certificates based on the indication. This may be done by overriding the relevant portions of tehr local replica with the updates received or by decoding the received message to identify the differences between the local replica and the server replica. In either case, once the user has updated its local replica, it has current information regarding the public keys of subscriber subjects of interests to this particular user.

The preceding discussion has presented a method and apparatus for providing public key certificate updates in real-time while reducing the data bandwidth requirements for such activities. With the present invention, end-users are provided, in real-time, update to public key certificates of subscriber subjects of interest to them. Thus, the information that an end-user receives is only information that is relevant to the end-user. In prior systems, an end-user would receive a certificate revocation list that would include thousands of entries wherein only a small percentage of the list would be of interest to the end-user. Further, the certificate revocation list was only provided on a daily basis such that an end-user may have data that is twenty-four (24) hours old.

What is claimed is:

1. A method fo r obtaining certificate status changes, the method comprising the steps of:
    a) generating, by an end user, certificates update subscription information that includes at least identity of a plurality of subscriber subjects that the end user is interested in and their associated public keys, and providing the certificates update subscription information to a server;
    b) providing an indication of a local replica of current certificates for those subscriber subjects that the end user has a desire to communicate with to the server while on-line with the server;
    c) receiving an indication of updated certificate for those subscriber subjects that the end user has a desire to communicate with, from the server when the updated certificate is inconsistent with the local replica of the current certificates; and
    d) while on-line, receiving an indication of a newly updated certificate from the server, wherein the newly updated certificate relates to information of interest as identified in the certificates update subscription information.

2. The method of claim 1 further comprises acknowledging receipt of the indication of the updated certificate.

3. The method of claim 1 further comprises providing the certificate update subscription information to include at least one of: identity of at least one of subscriber subject, a public key certificate of the at least one subscriber subject, an attribute certificate of the subscriber subject, identity of a certification authority and a cross-certificate.

4. The method of claim 1 further comprises providing the certificate update subscription information to include at least one of: signature public key certificate of at least one subscriber subject and an encryption public key certificate of the at least one subscriber subject.

5. The method of claim 1 further comprises, within step (d), receiving, as the indication of the newly updated certificate, at least one of: a new public key certificate for a subscriber subject, a revocation of a public key certificate of the subscriber subject, a change to the public key certificate of the subscriber subject.

6. The method of claim 1 further comprises, within step (b), providing the indication of the local replica as at least one of: a copy of the current certificate and a message indicating the current certificate.

7. The method of claim 1 further comprises, within step (c), receiving the updated certificate as at least one of: updates to the current certificate and a message regarding updates to the current certificate.

8. A method for providing certificate updates, the method comprises the steps of:
    a) generating, by an end user, certificate update subscription information that includes at least identity of a plurality of subscriber subjects that the end user is interested in and their associated public keys and receiving the certificate update subscription information from the user, wherein the certificate update subscription information includes current certificates for those subscriber subjects that the end user has a desire to communicate with, at least one of identity of at least one of subscriber subject, a public key certificate of the at least one subscriber subjects an attribute certificate of the subscriber subject, identity of a certification authority and a cross-certificate;
    b) monitoring certificate of the at least one subscriber subject;
    c) when a change occurs to the certificate, providing an indication of the change to the user,
    the method further comprising receiving an indication of a user replica of the certificate from the user, when the use is on-line;
    determining whether the user replica of the certificate is consistent with server replica of the certificate; and
    when the user replica of the certificate is inconsistent with the server replica of the certificate, providing an indication of the server replica of the certificate to the user.

9. The method of claim 8 further comprises providing the indication as at least one of: the server replica of the current certificate and an encoded message identifying differences between the user replica of the certificate and the server replica of the certificate.

10. The method of claim 8 further comprises, within step (c), providing the indication as an encoded message identifying the change to the certificate of the at least one subscriber subject.

11. The method of claim 8 further comprises, within step (b), monitoring the certificate by pulling the certificate and status of the at least one subscriber subject from a certification authority.

12. The method of claim 8 further comprises receiving information to change the certificate of the at least one subscriber subject.

13. The method of claim 8 further comprises, within step (a) receiving from an enduser or system administrator the certificate update subscription information.

14. A method for obtaining public key certificate updates, the method comprising the steps of:
    a) generating, by a user, certificate update subscription information that includes at least identity of at least one subscriber subject that the end user is interested in and their associated public keys, and providing by the user, the public key certificate update subscription information to a server, wherein the public key certificate update subscription information identifies at least one subscriber subject that the end user is interested in and their associated public keys;

b) monitoring, by the server, public key certificate of the at least one subscriber subject;

c) when a change occurs to the public key certificate, providing, by the serverd an indication of the change to the user;

d) while on-line, receiving, by the user, the indication of the change; and e) determining, by the user, newly updated public key certificate based on the indication of the change;

f) providing, by the user, an indication of a local replica of public key certificate to the server while on-line with the server;

g) determining, by the server, whether the local replica of the public kev certificate is inconsistent with current public key certificate of the at least one subscriber subject; and h) when the local replica of the public key certificate is inconsistent with the current public key certificate, providing, by the server, an indication of a difference between the local replica of the public key certificate and the current public key certificate.

15. A user of secure communication system, wherein the user comprises:

processing unit; and memory operably coupled to the processing unit, wherein the memory stores programming instructions that, when read by the processing unit, causes the processing unit to (a) generate certificate update subscription information that includes at least identity of at least one subscriber subject that the user is interested in and their associated public keys, and provide the public key certificate update subscription information to a server; (b) provide an indication of a local replica of current certificate for those subscriber subjects that the end user has a desire to communicate with to the server while on-line with the server; (c) receive updated certificate from the server when the updated certificate is inconsistent with the local replica of the current certificate; and (d) while on-line, receive newly updated certificate from the server, wherein the newly updated certificate relates to information of interest as identified in the certificate update subscription information.

16. The user of claim 15 further comprises, within the memory, programming instructions that, when read by the processing unit, causes the processing unit to acknowledge receipt of the indication of the updated certificate.

17. The user of claim 15 further comprises, within the memory, programming instructions that, when read by the processing unit, causes the processing unit to provide the certificate update subscription information to include identity of at least one subscriber subject and a public key of the at least one subscriber subject.

18. The user of claim 15 further comprises, within the memory, programming instructions that, when read by the processing unit, causes the processing unit to provide the certificate update subscription information to include at least one of: signature public key certificate of at least one subscriber subject and an encryption public key certificate of the at least one subscriber subject.

19. The user of claim 15 further comprises, within the memory, programming instructions that, when read by the processing unit, causes the processing unit to receive, as the indication of the newly updated certificate, at least one of a new public key certificate for a subscriber subject, a revocation of a public key certificate of the subscriber subject, a change to the public key certificate of the subscriber subject.

20. The user of claim 15 further comprises, within the memory, programming instructions that, when read by the processing unit, causes the processing unit to provide the indication of the local replica as at least one of a copy of the current public key certificate and a message indicating the current public key certificate.

21. The user of claim 15 further comprises, within the memory, programming instructions that, when read by the processing unit, causes the processing unit to receive the updated certificate as at least one of: updates to the current public key certificate and a message regarding updates to the current public key certificate.

22. A server of secure communication system, wherein the server comprises:

processing unit;

memory operably coupled to the processing unit, wherein the memory stores programming instructions that, when read by the processing unit, causes the processing unit to (a) generate by a user certificate update subscription information that includes at least identity of at least one subscriber subject that the end user is interested in and their associated public keys, and receive the certificate update subscription information from the user, wherein the certificate update subscription information for those subscriber subjects that the end-user has a desire to communicate with includes at least one of: identity of at least one of subscriber subject, a public key certificate of the at least one subscriber subject, an attribute certificate of the subscriber subject, identity of a certification authority and a cross-certificate; (b) monitor certificate of the at least one subscriber subject and the certification authority; (c) provide an indication of a change to the user when the change occurs to the certificate; and (i) receive an indication of a user replica of the certificate from the user, when the user is on-line; (ii) determine whether the user replica of the certificate is consistent with server replica of the certificate; and (iii) provide an indication of the server replica of the certificate to the use when the user replica of the certificate is inconsistent with the server replica of the certificate.

23. The server of claim 22 further comprises, within the memory, programming instructions that when read by the processing unit, causes the processing unit to provide the indication as at least one of: the server replica of the current certificate and an encoded message identifying differences between the user replica of the certificate and the server replica of the certificate.

24. The server of claim 22 further comprises, within the memory, programming instructions that, when read by the processing unit, causes the processing unit to provide the indication as an encoded message identifying the change to the public key certificate of the at least one subscriber subject.

25. The server of claim 22 further comprises, within the memory, programming instructions that, when read by the processing unit, causes the processing unit to monitor the certificate by pulling a public key certificate and status of the at least one subscriber subject from a certification authority.

26. The server of claim 22 further comprises, within the memory, programming instructions that, when read by the processing unit, causes the processing unit to receive information to change the certificate of the at least one subscriber subject.

27. The server of claim 22 further comprises, within the memory, programming instructions that, when read by the processing unit, causes the processing unit to receive from an end-user or system administrator the certificate update subscription information.

\* \* \* \* \*